June 3, 1930.   E. H. ADRIAN   1,761,287
GRAIN BIN OR CRIB
Filed July 9, 1928   2 Sheets-Sheet 1
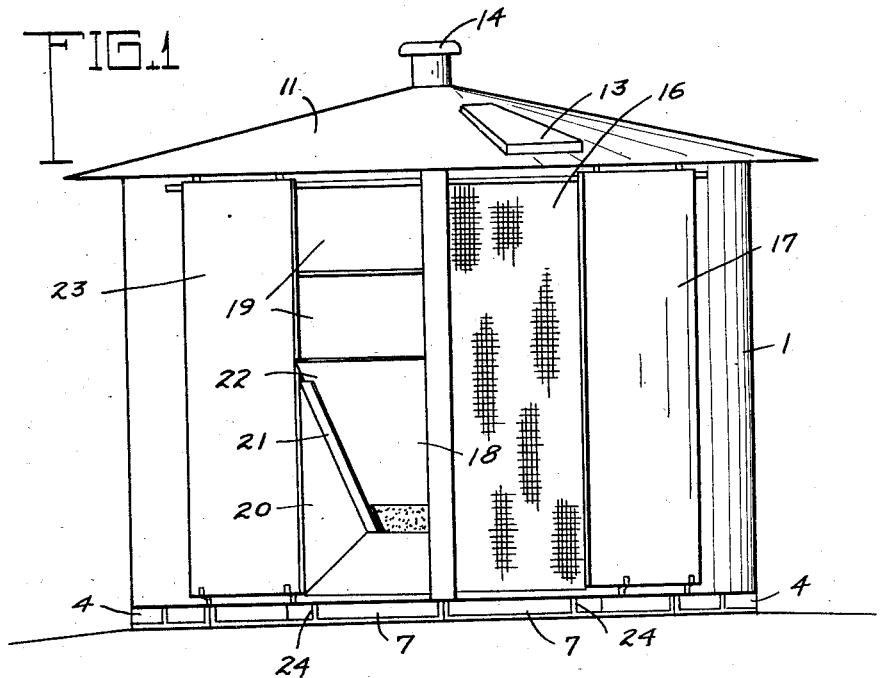
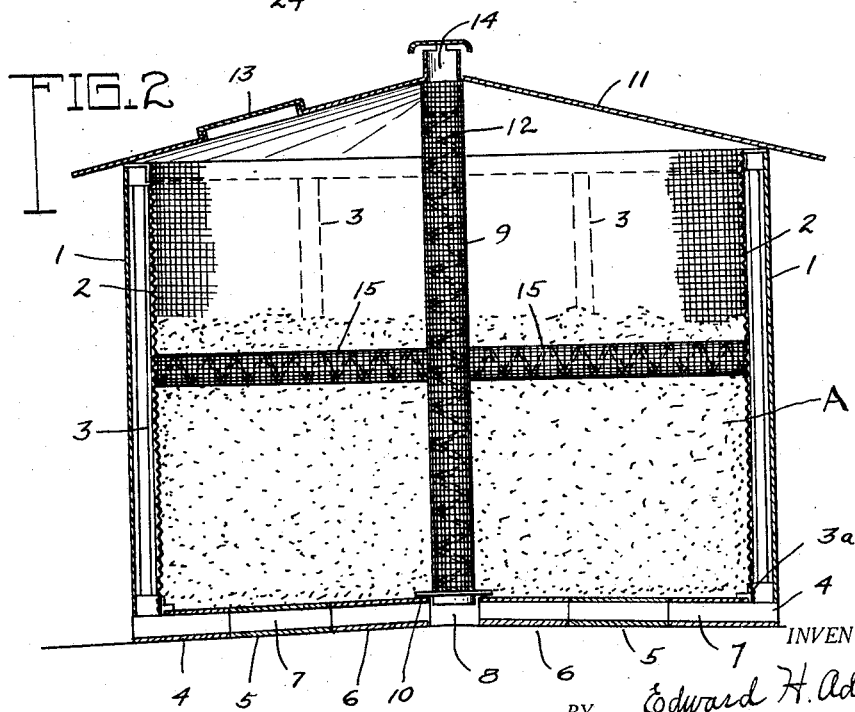
INVENTOR.
BY Edward H. Adrian,
Walter N. Haskell.
his ATTORNEY.

June 3, 1930.                     E. H. ADRIAN                    1,761,287
                                GRAIN BIN OR CRIB
                            Filed July 9, 1928          2 Sheets-Sheet 2
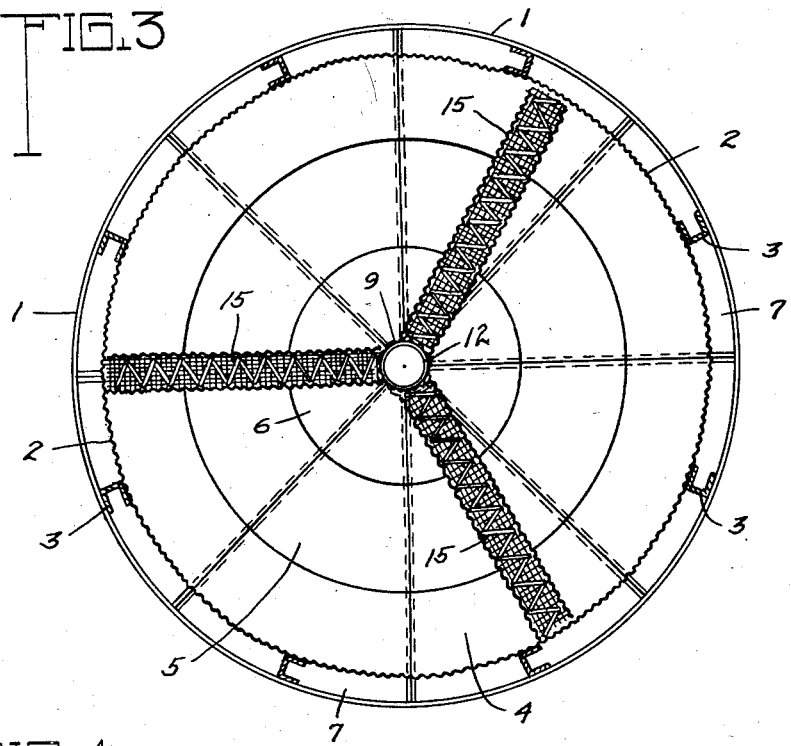
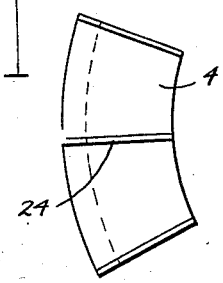
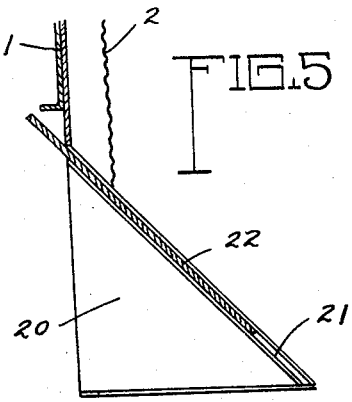
INVENTOR.
Edward H. Adrian,
BY Walter N. Haskell,
his ATTORNEY.

Patented June 3, 1930

1,761,287

UNITED STATES PATENT OFFICE

EDWARD H. ADRIAN, OF PORT BYRON, ILLINOIS

GRAIN BIN OR CRIB

Application filed July 9, 1928. Serial No. 291,401.

My invention has reference to a grain bin or crib, and is designed for use in storing large quantities of corn in the ear, shelled corn, or other grains. Its chief purpose is to provide a storage place for the grain in which it will be preserved not only from heating or rotting, or being subject to other conditions to which grain in the bin is usually liable, but in which it also will be preserved from rodents or other vermin.

One of the features of the invention consists in the provision of a receptacle for grain which embodies a thorough ventilating system, so as to induce a movement of air throughout the grain in storage, which has been found to be a difficult matter to accomplish. Said ventilating system is so constructed and protected that it is impossible for rats or mice to make use of same for getting into the grain.

Another purpose of the invention is to provide means for making it possible to determine at any time the height of the grain in the bin. A convenient means is also provided for starting the removal of the grain from the bin.

The above named and other features and advantages of the invention will be more fully understood from the following specification, reference being had to the drawings accompanying the same, in which;

Fig. 1 is an elevation of a crib which embodies the invention.

Fig. 2 is a vertical medial section thereof.

Fig. 3 is a horizontal cross-section through the body of the crib.

Fig. 4 is a detail of one of the sections 4, with the top plate removed.

Fig. 5 is a detail of the shoveling chamber 20, partly in section.

The invention is formed throughout of metal, and consists of an outer wall 1, preferably of a circular form, and an inner cylinder 2 spaced therefrom, and formed of wire netting or similar material. At intervals the walls 1 and 2 are united by posts 3, and fixed to the lower edge of the wall 2 is an angle-plate circle 3ª, the flange of which projects inwardly and rests upon the outer edge of a base formed of sections 4, 5, and 6, said sections tapering toward the center of the base. Said sections are preferably formed of tile, and passages 7 connect the outer sides thereof with a central space 8. The passages 7 also communicate at their outer ends with the space between the walls 1 and 2.

Extending upwardly from the space 8 is a cylindrical ventilator 9, supported on the base sections 6 by a collar 10 fixed to said ventilator. The upper end of the ventilator connects with a central opening in a roof 11, the outer edges of which project beyond the walls 1. The ventilator 9 is also formed of a wire mesh of suitable size and strength, and it is reinforced by a wire coil 12. At one side the roof 11 is provided with an opening, normally closed by a trap door 13, through which opening the grain may be introduced into the crib, as by a grain elevator. The central opening in the roof is provided with a ventilator cap 14.

When the receptacle is supplied with grain, as indicated at A in Fig. 2 the ventilator forms a chimney through which a current of air passes upwardly and outwardly, the air coming in through the passages 7 in the base. A similar movement of air is induced around the sides of the grain, between the walls 1 and 2. Auxiliary ventilators 15 are shown extending radially from the ventilator 9, the ventilators 15 being also of tubular form, and made of metal netting, with a coil reinforcement similar to that of the ventilator 9. The ventilators 15 are made to fit tightly between the ventilator 9 and wall 2, and they are installed by laying the same on the top of the grain after it has attained to a desired height. After the grain reaches to a height to cover the ventilators 15 they form laterals between the central chimney and the outer space between the walls, and assist in causing a thorough circulation of air through the grain. As many sets of the lateral ventilators can be provided as may be desired, and any number of the ventilators provided for each set. They can also be arranged spirally if desired.

It will be noted that any rodent which may enter the crib through the passages in the base will merely pass upwardly through the central chimney and out at the top, or one that happens to get in at the top will pass downwardly and out at the bottom, without any possibility of getting into the grain. The grain is also stored at a point above the ground, so that moisture cannot enter the same, and the floors of the passages 7 are formed so as to slope outwardly, preventing the water from finding its way into the center. If desired, a foundation of concrete or other suitable material may be provided for the base of the crib to rest on. The forming of the base in sections also makes it possible to transport the crib and base from one place to another, or store the same.

In Fig. 1 the outer wall is shown provided with a netting section 16, through which the interior of the crib may be viewed, to determine the height of the grain therein. Said netting section is normally closed by a door 17, rollingly supported. An opening 18 is also provided in the wall 1, the upper part of which is closed by removable doors 19, and in the lower part is installed a shoveling chamber 20, opening to the interior of the crib, and having inclined ways 21, in which is slidable a gate 22. When it is desired to remove some of the grain the gate 22 is raised a little and the grain permitted to run out into the chamber 20, from which it can be shovelled. As more of the grain is removed, and it is desired to enter the crib, the doors 19 are removed, permitting free access to the interior. The opening 18 is normally closed by a door 23, also rollingly supported, so as to be easily moved to one side, as shown.

One of the sections 4 is shown in Fig. 4, the same being provided with a central rib 24 for strength. The sections 5 and 6 can be similarly reinforced.

What I claim, and desire to secure by Letters Patent, is:

1. A crib for grain, comprising an outer metal casing and roof therefor, having a central opening, a recticulate wire container within said casing and spaced therefrom, a hollow base for said crib having air intake passages and a central opening therefor, said passages communicating with the space between said casing and said container, a reinforced wire net-work cylinder extending from said opening in the base to the opening in the roof, and lateral wire net-work cylinders extending from said first-named cylinder to the wall of said container, said cylinders forming air-ducts when the container is provided with a supply of grain.

2. In a device of the class described, an outer enclosure, an inner net-work container spaced from the outer enclosure, a central wire mesh cylinder and radial wire mesh cylinders connected therewith, and enclosed air passages connecting with said central cylinder and with the space between said container and said enclosure.

In testimony whereof I affix my signature.
EDWARD H. ADRIAN.